United States Patent [19]
Meyn

[11] Patent Number: 5,186,679
[45] Date of Patent: Feb. 16, 1993

[54] APPARATUS FOR EVISCERATING SLAUGHTERED POULTRY

[75] Inventor: Cornelis Meyn, Oostzaan, Netherlands

[73] Assignee: Machinefabriek Meyn B.V., Netherlands

[21] Appl. No.: 899,017

[22] Filed: Jun. 15, 1992

Related U.S. Application Data

[63] Continuation of Ser. No 820,315, Jan. 9, 1992, abandoned.

Foreign Application Priority Data

Jan. 30, 1991 [NL] Netherlands ............... 9100153

[51] Int. Cl.$^5$ ............................................. A22C 21/06
[52] U.S. Cl. .................................... 452/117; 452/118
[58] Field of Search ...................... 452/118, 106, 117

[56] References Cited

U.S. PATENT DOCUMENTS

| | | | |
|---|---|---|---|
| 3,234,592 | 2/1966 | Palmer et al. | 452/106 |
| 3,605,179 | 9/1971 | Harben, Jr. | 452/118 |
| 3,685,096 | 8/1972 | Harben, Jr. | 452/118 |
| 3,902,221 | 9/1975 | Harben, Jr. et al. | 452/118 |
| 3,979,793 | 9/1976 | Hazenbroek | 452/118 |
| 4,019,222 | 4/1977 | Scheier et al. | 452/117 |
| 4,262,387 | 4/1981 | Scheier et al. | 452/117 |
| 4,467,498 | 8/1984 | Graham et al. | 452/117 |
| 4,724,581 | 2/1988 | van de Nieuwelaar | 452/118 |

FOREIGN PATENT DOCUMENTS

| | | |
|---|---|---|
| 0094724A3 | 11/1983 | European Pat. Off. . |
| 0178825A1 | 4/1986 | European Pat. Off. . |
| 3709869 | 10/1988 | Fed. Rep. of Germany ...... 452/118 |
| 3709869A1 | 10/1988 | Fed. Rep. of Germany . |
| 35067 | 11/1934 | Netherlands . |
| 6805159 | 7/1969 | Netherlands . |
| 7100142 | 7/1972 | Netherlands . |
| 7205388 | 7/1973 | Netherlands . |
| 8104877 | 5/1983 | Netherlands . |
| 7399965 | 8/1984 | Netherlands . |

Primary Examiner—Willis Little
Attorney, Agent, or Firm—Shefte, Pinckney & Sawyer

[57] ABSTRACT

In an apparatus for eviscerating slaughtered birds an eviscerating means (15) is applied, which at its foremost end carries a processing member for engaging the gullet of the bird. The eviscerating means (15) is pivotable from and towards the spinal column of the bird, whereas the processing member comprises two halves, which are rotatable between a position, in which they are substantially aligned and a position in which they engage each other substantially in a coplanar fashion while clamping between them the gullet of the bird. Preferably the processing member halves comprise each a substantially C-shaped brace (28, 29). The pivotal movement of the eviscerating means (15) and the rotational movement of the processing member halves (28, 29) are mutually coupled.

9 Claims, 4 Drawing Sheets

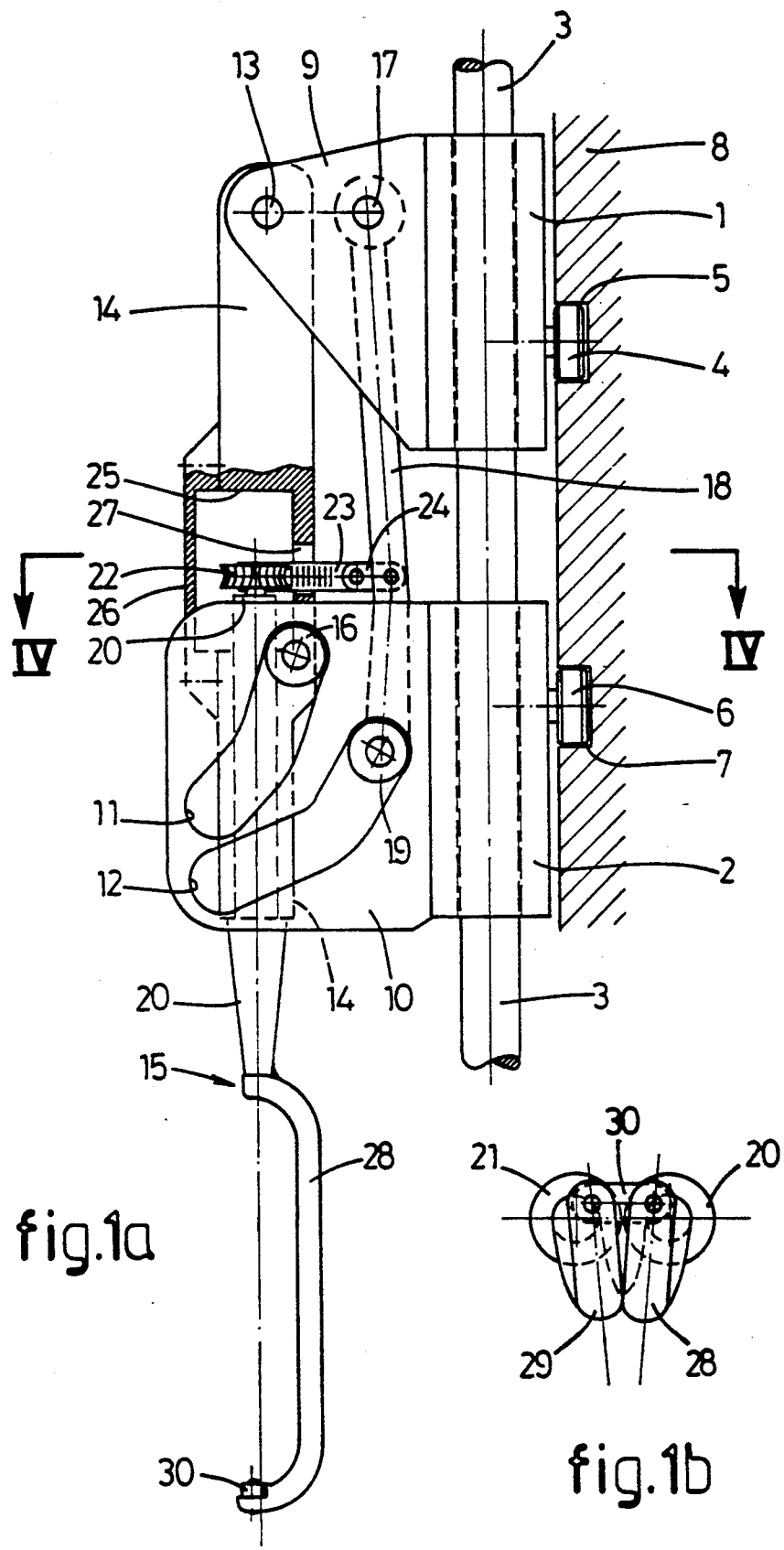

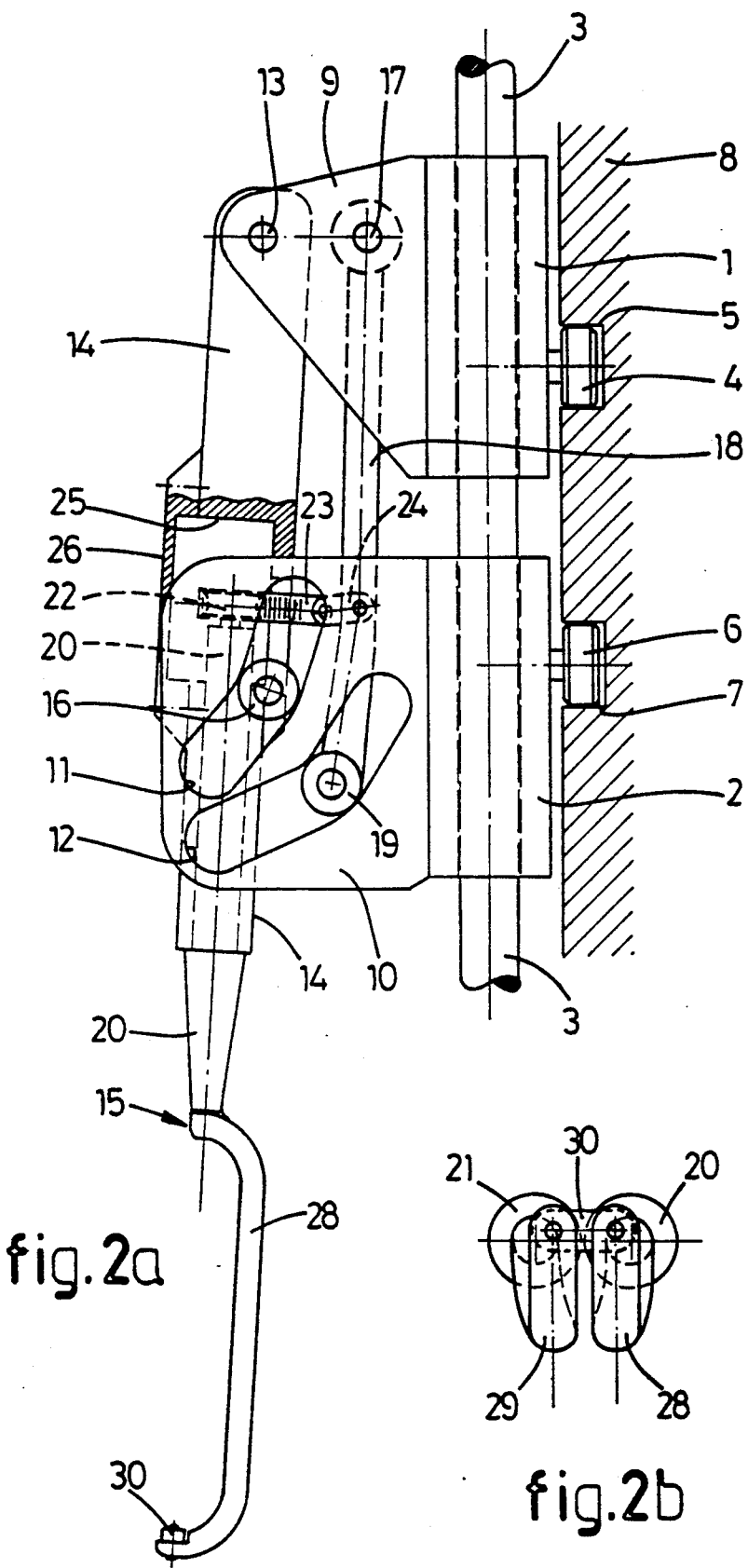

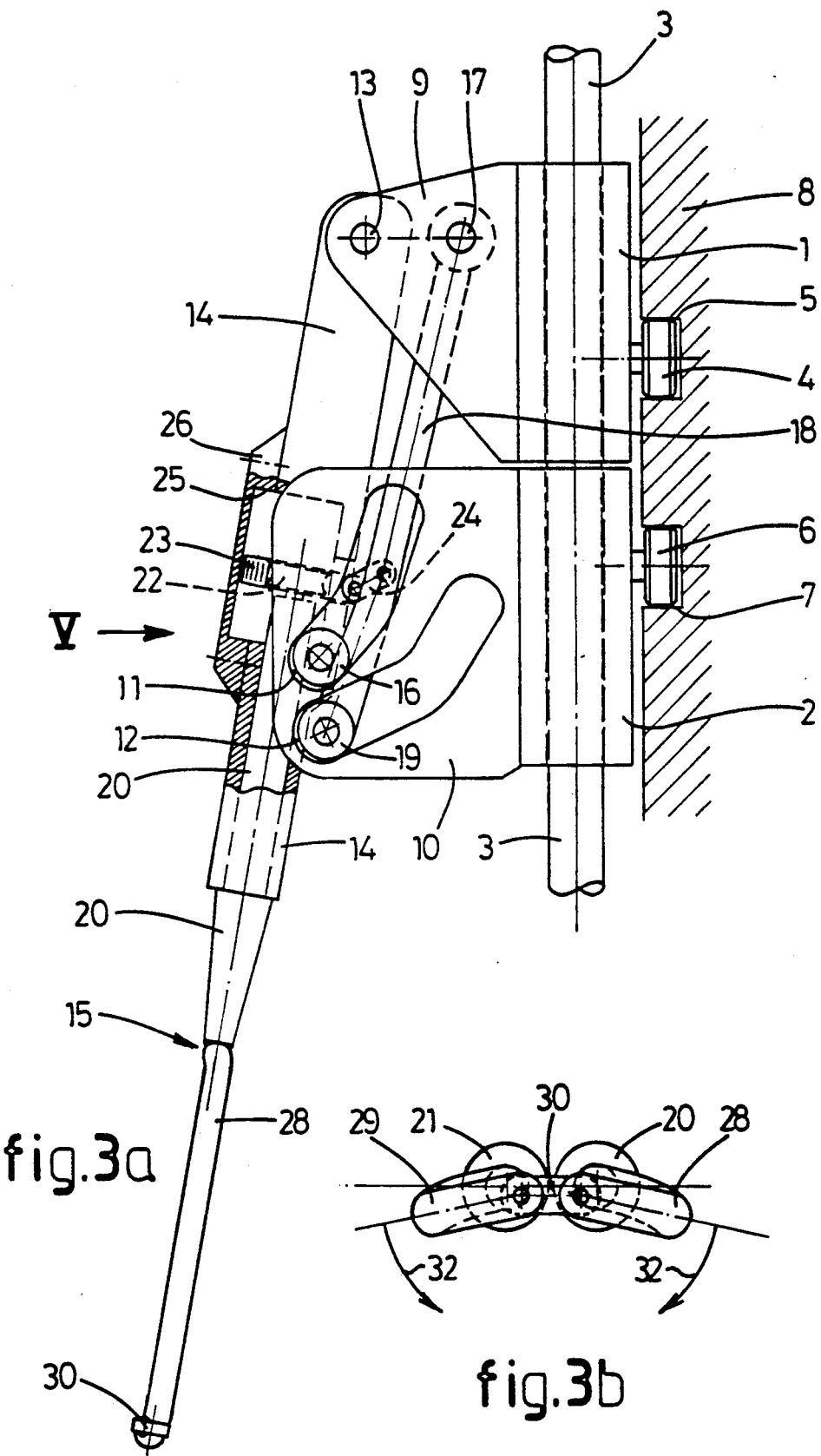

APPARATUS FOR EVISCERATING SLAUGHTERED POULTRY

This is a continuation of co-pending application Ser. No. 07/820,315, filed Jan. 9, 1992, now abandoned.

The invention relates to an apparatus for eviscerating slaughtered poultry, comprising an eviscerating means which through an opening between the sternum and the tail of a bird suspended with its ankle joints from a hook and resting with its back against a counter pressure surface is entered into the bird, whereby said eviscerating means carries at its foremost end a processing member for engaging the gullet of the bird, which when the eviscerating tool enters the bird is positionable in a first position and which when reaching the extreme position of the eviscerating means is movable towards the spinal column into a second position for engaging the gullet and which in this position together with the eviscerating means is moved out of the bird.

An apparatus for eviscerating slaughtered poultry of this type is known from Dutch patent specification 166.841 in the name of applicant. In this known apparatus the eviscerating means at its lower most end comprises an extension piece which can be pivoted towards the spinal column and in which a wedge shaped slit is provided being flanked by two balls. If, in the extreme position of the eviscerating means, the extension piece is pivoted the gullet of the bird is received in the wedge shaped slit.

Although with this known apparatus for eviscerating slaughtered poultry the entrails package, inclusive gullet and craw, may be removed effectively from the bird, the risk occurs when using this apparatus that the entrails will be damaged and the contents thereof spoils or contaminates the bird. Such a damage of the entrails is caused by the fact, that the gullet of the bird is not received tightly wedged in the wedge shaped slit but, while moving the eviscerating means out of the bird, may slide relative to the extension piece until the entrails engage the extension piece. For loosening the gullet and craw, which are firmly attached to the neck of the bird, the extension piece exerts a considerable force onto the entrails which probably causes their rupture.

It is an object of the invention to provide an apparatus for eviscerating slaughtered poultry of the type referred to above in which this disadvantage is eliminated in a simple, but nevertheless effective way.

Thus the apparatus for eviscerating slaughtered poultry according to the invention is characterized in that the processing member comprises two halves which can rotate around rotation axes extending in parallel with the longitudinal axis of the eviscerating means and which, in the first position, are substantially aligned and which, in the second position, engage each other substantially in a co-planar fashion while clamping between them the gullet of the bird.

When both processing member halves are rotated from the first position towards the second position the gullet of the bird is firmly gripped between both halves. When now in this position of the processing member halves the processing member, together with the eviscerating means, is moved out of the bird the gullet can not slide relative to the processing member but is directly disengaged from the neck of the bird. Thus no large forces are exerted onto the entrails of the bird and damages of the entrails may be prohibited in a reliable way.

In a preferred embodiment of the apparatus the processing member halves each comprise a substantially C-shaped brace. When moving from the first position towards the second position the C-shaped braces move towards each other outside of the entrails thereby tearing loose the membrane surrounding the lungs of the bird such that the lungs come loose from the bird. In contrast therewith in the apparatus according to the state of the art it was necessary to loosen the membrane surrounding the lungs by scraping the extension piece of the eviscerating means with a foremost end along the ribs of the bird, which caused an increased risk on rib fracture and thus a risk on bone fragments in the meat. By using C-shaped braces according to the invention however the lungs may be loosened from the ribs without any damage. The lowermost end of both C-shaped braces causes clamping the gullet of the bird.

The C-shaped braces have a small volume and have in their first position no projections what soever. This means that, while entering the eviscerating means into the bird, the processing member can be moved along the entrails, especially the liver, without causing any damages thereto. Damages of the livers have to be avoided because this would render them unfit for consumption. Only after passing the liver the C-shaped braces are moved towards the second position and the gullet of the bird is clamped.

Constructively it is advantageous if the eviscerating means comprises two rods which each carry a processing member half and which are rotatably borne in a block movable upwards and downwards along a guide. The rotational movement of the rods leads to moving the processing member halves from the first position towards the second position and vice versa. The upward and downward movement of the block is meant for moving the eviscerating means into and out of the bird.

In this respect it is favourable, if the block relative to the guide, can pivot around a horizontal axis between a first position in which the processing member is distanced further from the spinal column of the bird and a second position in which the processing member is closer to the spinal column. As a result of the pivotability of the block relative to the guide it is possible to move the eviscerating means together with the processing member downwards along the sternum of the bird and next to pivot it towards the spinal column, such that the processing member halves engage the gullet of the bird.

In a special embodiment of the apparatus according to the invention the rotational movement of the processing member halves is coupled such with the pivotal movement of the block that the first position of the processing member halves occurs substantially simultaneously with the first position of the block, whereas the second position of the processing member halves occurs substantially simultaneously with the second position of the block. Due to such a coupling between the movements of the processing member halves and the block the apparatus according to the invention can, completely automatically, carry out an optimal movement for eviscerating the bird. In the first position of the block, in which the processing member is distanced furthest from the spinal column of the bird, the processing member halves are in a first position such as to pass freely along the entrails. If the block is pivoted towards the second position the processing member automatically moves towards the spinal column, whereby the processing member halves close and grip the gullet. In such a position the block then can be moved upwards along the guide for removing the entrails package from the bird.

The rotational movement of the processing member halves may be realized in an easy way when the rods are connected at their upper sides with drive means causing the rotational movement. In correspondance with a simple constructive solution then the rods carry at their upper sides gears engaged by gear racks which can move to and fro relative to the block.

According to a preferred embodiment of the apparatus according to the invention on the guide an upper slide is provided carrying the horizontal pivot axis of the block, whereas on the guide further a lower slide is provided which comprises a first curved track cooperating with a follower roll attached to the block, whereas a pivot arm, which is connected with the gear racks, can pivot around another horizontal pivot axis provided on the first slide, said arm carrying at its free end a follower roll which cooperates with a second curved track provided on the second slide, whereby the curved tracks are shaped such that through a change of the mutual distance between the two slides on one hand the desired pivotal movement of the block and the rods borne therein is obtained and on the other hand the desired relative movement of the pivot arm and the gear racks connected thereto is obtained relative to the gears provided on the rods of the eviscerating means for rotating the processing member halves.

In such a way the coupling between the rotational movement of the processing member halves and the pivotal movement of the block mentioned before is realized, such that the apparatus completely automatically carries out the most optimal processing movements.

The movement of both slides may be realized in a simple way, if the two slides are provided with follower rolls cooperating with stationary curved tracks. The shape of the curved tracks then determines the movements of the block and the processing member halves. A movement of the lowermost slide relative to the uppermost slide, whereby the latter maintains the same vertical position, leads to a pivotal motion of the block and a rotation of the processing member halves without a vertical displacement thereof relative to the bird. When however both slides, while maintaining their relative distance, are displaced in vertical direction the eviscerating means will move into or out of the bird without a pivoting of the block and without a rotation of the processing member halves. Finally also a combined movement is possible whereby the uppermost slide is displaced in vertical direction, whereas the lowermost slide is displaced in vertical direction such, that the mutual distance between both slides changes. Now the block pivots and the processing member halves rotate whereas the eviscerating means is moved in vertical direction into or out of the bird.

By an appropriate choice of the shape of the curved tracks now any desired movement of the eviscerating means can be realized, which is most advantageous for applying the eviscerating means into the bird, next engaging the gullet and entrails and finally moving the eviscerating means out of the bird.

DESCRIPTION OF THE DRAWINGS

Hereinafter the invention will be elucidated further by means of the drawing, in which an embodiment of the apparatus according to the invention is illustrated.

FIG. 1a shows schematically and in a side elevational view a first of an apparatus according to the invention in a first position;

FIG. 1b shows on a larger scale, a bottom plan view of the eviscerating means used with the apparatus according to FIG. 1a;

FIG. 2a shows schematically and in a side elevational view an embodiment of an apparatus according to the invention in a second position;

FIG. 2b shows, on a larger scale, a bottom plan view of the eviscerating means used with the apparatus according to FIG. 2a;

FIG. 3a shows schematically and in a side elevational view an embodiment of an apparatus according to the invention in a third position;

FIG. 3b shows, on a larger scale, a bottom plan view of the eviscerating means used with the apparatus according to FIG. 3a;

FIG. 4 shows schematically a section along IV—IV in FIG. 1a, and

Figure 5:
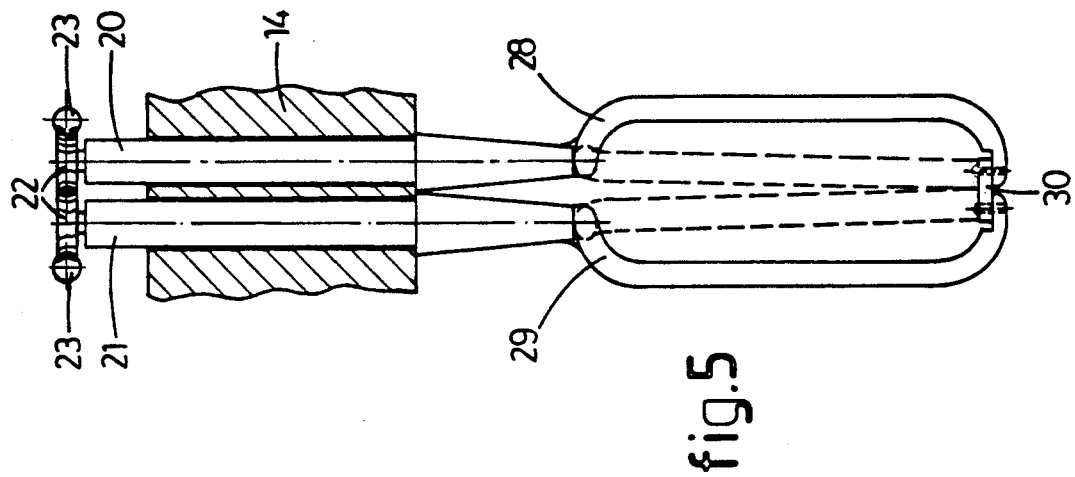
FIG. 5 shows schematically, along arrow V in FIG. 3a, the position of the eviscerating means in the previously shown apparatus.

The apparatus shown in the figures comprises an upper slide 1 and a lower slide 2 which are each movable upwards and downwards along a guide 3. The upper slide 1 comprises a follower roll 4 cooperating with a curved track 5. Correspondingly the lower slide 2 carries a follower roll 6 cooperating with a curved track 7. The curved tracks 5 and 7 are provided in a stationary part 8 not shown further.

Before giving a more detailed description of the apparatus according to the invention the following is noted. In processing slaughtered birds it is known to supply them, with their ankle joints suspended from hooks of a suspension conveyor, to a cylindrical processing machine. Such a cylindrical processing machine comprises processing devices divided along its circumference, which are moved with a velocity corresponding with the velocity of the suspension conveyor. Each processing device is fit for temporarily receiving a slaughtered bird supplied by the suspension conveyor and for carrying out the desired process. Indeed with the apparatus according to the present invention such a cylindrical processing machine may be provided; in such a case the stationary part 8 forms a stationary cylinder in which the curved tracks 5 and 7 are shaped. The guide 3 and the apparatus to be described hereinafter then is part of one of the processing devices divided along the circumference of such a machine and following a circular track around the stationary part 8. The suspension conveyor together with special positioning means for positioning the slaughtered birds relative to the processing device, such as a counter pressure surface for the bird, have not been illustrated.

Figure 4:
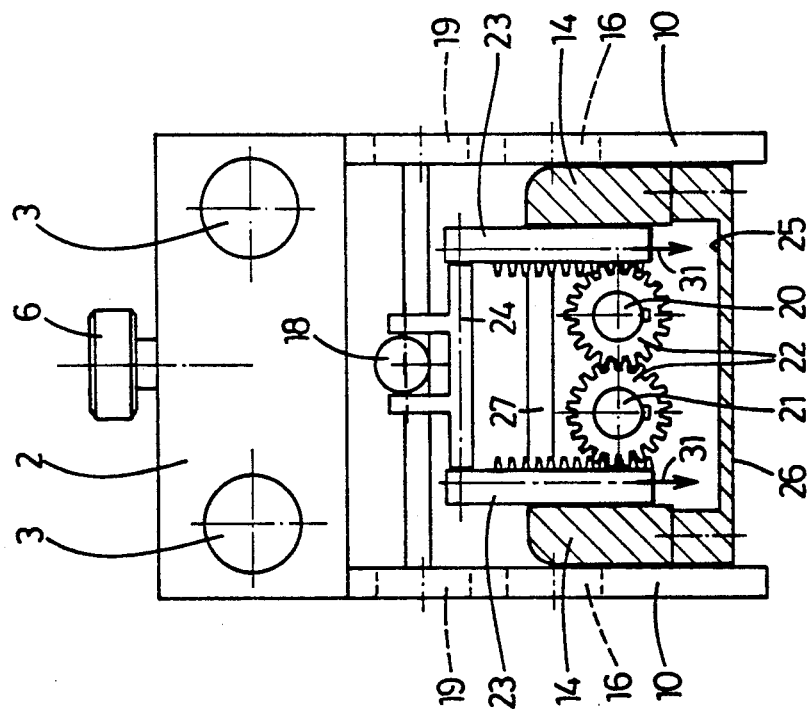

The upper slide 1 comprises two parallel bearing plates 9 (of which only one is visable), whereas the lower slide 2 comprises two curved plates 10 (of which only one is visable in FIG. 1a, 2a and 3a but which are both visable in FIG. 4). In the curved plates 10 two curved tracks 11 and 12 are provided of which the function will appear later. In the bearing plates 9 of the upper slide 1 a block 14 is pivotably borne through an horizontal axis 13. In the block 14 an eviscerating means 15 to be described later is borne. At both sides of the block 14 follower rolls 16 are provided which are housed in and cooperate with the curved track 11. In the bearing plates 9 of the upper slide 1 further a pivot-arm 18 is pivotably borne through another horizontal axis 17. This pivotarm 18 carries at its free end follower rolls 19, which are housed in and cooperate with the curved track 12.

The eviscerating means 15 already mentioned before shortly comprises two rods 20 and 21 (both visible in FIG. 5) which are borne in the block 14 for a rotation around their longitudinal axes. The rods 20 and 21 carry at their uppermost side gears 22 which on one hand engage each other (see FIG. 4) and which on the other hand are engaged by gear racks 23 slideable in the block 14. Through a hinge section 24 the gear racks 23 are connected with the pivot arm 18. The hinge section 24 can pivot relative to the pivot arm 18 as well as relative to the gear racks 23.

The uppermost end of the rods 20 and 21 and the gears 22 attached thereto are housed in a cavity 25 formed in the block 14, which is covered by a cover 26. The gear racks 23 project in the cavity 25 via a recess 27.

At its foremost (lower) end the eviscerating means 15 comprises a processing member existing of two C-shaped braces and 29 which at their lower ends are interconnected by a hinge lip 30.

The operation of the apparatus will now be described starting from the position shown in FIG. 1a. In this position the C-shaped braces 28 and 29, as appears from FIG. 1b, engage each other substantially in a co-planar fashion. Thus the eviscerating means 15 locally has a compact shape, such that it is easy to enter the eviscerating means into a slaughtered bird to be processed via an opening between the sternum and the tail.

The upper and lower slides 1 and 2, respectively, are somewhat distanced, whereby the follower rolls 16 and 19 are positioned at the upper end of the respective curved tracks 11 and 12. Relative to the gears 22 attached to the rods 20 and 21 the gear racks 23 take in the position shown in FIG. 4.

When the processing apparatus is displaced relative to the stationary part 8 the curved tracks 5 and 7 provide, via the follower rolls 4 and 6, for a displacement of the upper slide 1 and the lower slide 2. FIG. 2a shows the situation, in which the mutual distance between both slides 1 and 2 has diminished. As a result of the decrease of this mutual distance the follower rolls 16 and 19 are displaced in the corresponding curved tracks 11 and 12. Resulting therefrom the block 14 and pivot arm 17 have been pivoted around their horizontal axes 13 and 17, respectively, such that the C-shaped braces 28 and 29 are now distanced further from the stationary part 8.

FIG. 2a shows clearly that the first part of the curved track 12, which has already been passed by the follower roll 19, runs more steeply relative to a vertical line then the first part of the curved track 11 already passed by the follower roll 16. This means, that the pivot arm 18 has been pivoted more than the block 14, such that the gear racks 23 have been displaced relative to the gears 22. In FIG. 4 such a displacement has been indicated by arrows 31. As a result of this, however still small, displacement of the gear racks 23 relative to the gears 22 the rods 20 and 21 of the eviscerating means 15 are rotated, such that the C-shaped braces 28 and 29 will assume the position indicated in FIG. 2b. While the C-shaped braces 28 and 29 are still lying against each other in FIG. 1b, it appears from FIG. 2b that now these braces already are somewhat distanced.

In FIG. 3a a position is illustrated in which the follower rolls have positioned the lower and upper slide 1 and 2, respectively, close together. The follower rolls 16 connected with the block 14 have reached the opposite end of the curved track 11 whereas the follower rolls 19 attached to the pivot arm 18 have reached the opposite end of the curved track 12. In this position the block 14 assumes its extreme pivotal position in which the distance between the C-shaped braces 28 and 29 and the stationary part 8 is maximized. Further it appears that the follower roll 19 has passed a section of the curved track 12 which encloses a far greater angle with a vertical line than the corresponding second section of the curved track 11 being passed by the follower roll 16. This means that the pivot arm 18 is more strongly pivoted than the block 14, such that the gear racks 23 which are connected with the pivot arm 18 through the hinge section 24 have further rotated the gears 22 and the rods 20 and 21 connected thereto. Finally the C-shaped braces have reached the position shown in FIG. 3b in which they are substantially aligned. If, starting from this position, the distance between the slides 1 and 2 is increased again, again a pivotal movement of the C-shaped braces 28 and 29 in correspondance with the arrows 32 indicated in FIG. 3b occurs.

Using the mechanism described before the eviscerating means 15 may obtain two different movements. When the mutual distance between the slides 1 and 2 varies, as a result of the cooperation between the follower rolls 16, 19 and the curved tracks 11 and 12 a pivotal movement of the block 14 will occur, whereby a rotation of the C-shaped braces 28 and 29 occurs too. The pivotal movement of the block 14 leads to a change of the distance between the C-shaped braces 28, 29 and the stationary part 8. Such a pivotal movement can be realized if the vertical position of the upper slide 1 remains unchanged, whereas the lowermost slide 2 is moved upwards or downwards.

However, it is possible too that the eviscerating means 15 is displaced upwards or downwards. To realize this the upper slide 1 has to be displaced upwards or downwards along the guide 3 whereby, through a synchronous displacement of the lower slide, the distance towards the lower slide does not change (resulting in no pivotal movement of the block 14) or whereby a change of the mutual distance with the lower slide 2 occurs which then will lead to a pivotal movement of the block 14 too.

Generally a slaughtered bird to be processed takes in a stationary position relative to the stationary part 8. Thus the back of the slaughtered bird is directed towards the stationary part 8, whereas the sternum is directed away from it. When entering the eviscerating means 15 via an opening between the sternum and the tail of the respective bird the C-shaped braces 28, 29 are in the position shown in FIG. 1a and 1b. As a result the eviscerating means 15 is compactly shaped at the braces 28 and 29. Immediately after entering the bird (through a simultaneous downwardly directed displacement of the upper and lower slides 1, 2 along the guide 3) the mutual distance between the slides 1 and 2 is decreased until finally the position corresponding with FIG. 3a and 3b is obtained. In this entirely opened position of the C-shaped braces 28, 29 (visable in FIG. 3b) the eviscerating means 15 can pass the liver of the bird without damaging it.

Having reached the lowermost position the distance between both slides is increased again, whereby the upper slide 1 is not displaced. The C-shaped braces 28 and 29 will be moved towards the stationary part 8 and thus towards the spinal column of the bird, whereas the C-shaped braces are rotated towards the position shown in FIG. 1b. Then the C-shaped braces 28 and 29 move towards each other around the entrails of the bird, thus effectively loosening from the rest of the bird a membrane protecting the lungs of the bird. Moreover the lowermost parts of the C-shaped braces, near to the hinge lip 30 are pressed against each other while gripping the gullet and the craw of the bird. Then the entrail package rests on the spoonlike lower side of the braces 28 and 29 positioned like this.

In the position shown in FIG. 1a the eviscerating means 15 is moved upwards relative to the bird by a simultaneous upwardly directed displacement of the slides 1 and 2. Then the gullet and craw are loosened from the neck of the bird whereas the entrails are lifted. Finally the entire entrails package with craw and gullet are removed from the body cavity of the bird.

If the vertical length of the C-shaped braces 28 and 29 is sufficient abdominal grease present between the entrails and the carcass of the bird is pinched of, such that the entrails package is entirely loosened from the bird and may be discharged directly when leaving the body cavity. If however the braces are shaped smaller the connection at the abdominal grease remains, such that indeed the entrails package is removed out of the body cavity of the bird, however remains connected with the bird through the abdominal grease and stays suspended at the outside of the bird. In such a position the entrails package may be inspected for irregularities before being discharged.

Although previously an embodiment of the apparatus has been described in which the pivotal movement of the block 14 and the rotation of the rods 20 and 21 are caused by a cooperation between the follower rolls 16, 19 and the curved tracks 11 and 12, it will be clear, that for pivoting the block 14 and for rotating the rods 20 and 21 each known mechanic, electric, pneumatic or hydraulic movement mechanism known per se can be applied. It is only important that the pivotal movement of the block and the rotational movement of the rods (and the C-shaped braces 28, 29) may be realized separately and in combination.

The invention is not limited to the embodiment described before, which can be varied widely within the scope of the invention.

I claim:

1. Apparatus for eviscerating slaughtered poultry, comprising an eviscerating means which through an opening between the sternum and the tail of a bird suspended with its ankle joints from a hook and resting with its back against a counter pressure surface is entered into the bird, whereby said eviscerating means carries at its foremost end a processing member for engaging the gullet of the bird, which when the eviscerating tool enters the bird is positionable in a first position and which when reaching the extreme position of the eviscerating means is movable towards the spinal column into a second position for engaging the gullet and which in this position together with the eviscerating means is moved out of the bird, characterized in that the processing member comprises two halves (28, 29) which can rotate around rotation axes extending in parallel with the longitudinal axis of the eviscerating means (15) and which, in the first position, are substantially aligned and which, in the second position, engage each other substantially in a co-planar fashion while clamping between them the gullet of the bird.

2. Apparatus according to claim 1, characterized in that the processing member halves each comprise a substantially C-shaped brace (28, 29).

3. Apparatus according to claim 1, characterized in that the eviscerating means (15) comprises two rods (29, 21) which each carry a processing member half (28, 29) and which are rotatably borne in a block (14) movable upwards and downwards along a guide (3).

4. Apparatus according to claim 3, characterized in that the block (14), relative to the guide (3), can pivot around a horizontal axis (13) between a first position in which the processing member is distanced further from the spinal column of the bird and a second position in which the processing member is closer to the spinal column.

5. Apparatus according to claim 4, characterized in that the rotational movement of the processing member halves (28, 29) is coupled such with the pivotal movement of the block (14) that the first position of the processing member halves occurs substantially simultaneously with the first position of the block, whereas the second position of the processing member halves occurs substantially simultaneously with the second position of the block.

6. Apparatus according to claim 5, characterized in that the rods (20, 21) are connected at their upper sides with drive means (22, 23) causing the rotational movement.

7. Apparatus according to claim 6, characterized in that the rods (20, 21) carry at their upper sides gears (22) engaged by gear racks (23) which can move to and fro relative to the block (14).

8. Apparatus according to claim 7, characterized in that on the guide (3) an upper slide (1) is provided carrying the horizontal pivot axis (13) of the block (14), whereas on the guide further a lower slide (2) is provided which comprises a first curved track (11) cooperating with a follower roll (16) attached to the block, whereas a pivot arm (18), which is connected with the gear racks (23), can pivot around another horizontal pivot axis (17) provided on the first slide (1), said arm carrying at its free end a follower roll (19) which cooperates with a second curved track (12) provided on the second slide (2), whereby the curved tracks are shaped such that through a change of the mutual distance between the two slides on one hand the desired pivotal movement of the block and the rods (20, 21) borne therein is obtained and on the other hand the desired relative movement of the pivot arm (18) and the gear racks (23) connected thereto is obtained relative to the gears (22) provided on the rods of the eviscerating means (15) for rotating the processing member halves (28, 29).

9. Apparatus according to claim 8, characterized in that the two slides (1, 2) are provided with follower rolls (4, 6) cooperating with stationary curved tracks (5, 7).

* * * * *

UNITED STATES PATENT AND TRADEMARK OFFICE
CERTIFICATE OF CORRECTION

PATENT NO. : 5,186,679

DATED : February 16, 1993

INVENTOR(S) : Cornelis Meyn

It is certified that error appears in the above-identified patent and that said Letters Patent is hereby corrected as shown below:

Column 1, line 38, after "fact" delete ",".

Column 1, line 50, after "effective" insert -- , --.

Column 2, line 21, delete "what soever" and insert therefor -- whatsoever --.

Column 2, line 40, delete "favourable, if the block" and insert therefor -- favourable if the block, --.

Column 3, line 58, after "such" delete ",".

Column 4, line 7, after "first" insert -- embodiment --.

Column 4, line 9, after "shows" insert -- , --.

Column 5, line 28, after "braces" insert -- 28 -- (in bold print).

Column 5, line 59, delete "then" and insert therefor -- than --.

Column 5, line 61, after "means" delete ",".

Column 6, line 34, after "12" insert -- , --.

Column 7, line 13, after "braces" delete ",".

Column 7, line 27, delete "of" and insert therefor -- off --.

UNITED STATES PATENT AND TRADEMARK OFFICE
CERTIFICATE OF CORRECTION

PATENT NO. : 5,186,679

DATED : February 16, 1993

INVENTOR(S) : Cornelis Meyn

It is certified that error appears in the above-identified patent and that said Letters Patent is hereby corrected as shown below:

Column 7, line 42, after "clear" delete ",".

Column 8, line 13, delete "29" and insert therefor -- 20 -- (in bold print).

Signed and Sealed this

Twenty-first Day of December, 1993

Attest:

BRUCE LEHMAN

Attesting Officer   Commissioner of Patents and Trademarks